Jan. 14, 1947.  T. F. SPACKMAN  2,414,214
CONVERTIBLE VEHICLE
Filed April 17, 1942  3 Sheets-Sheet 2
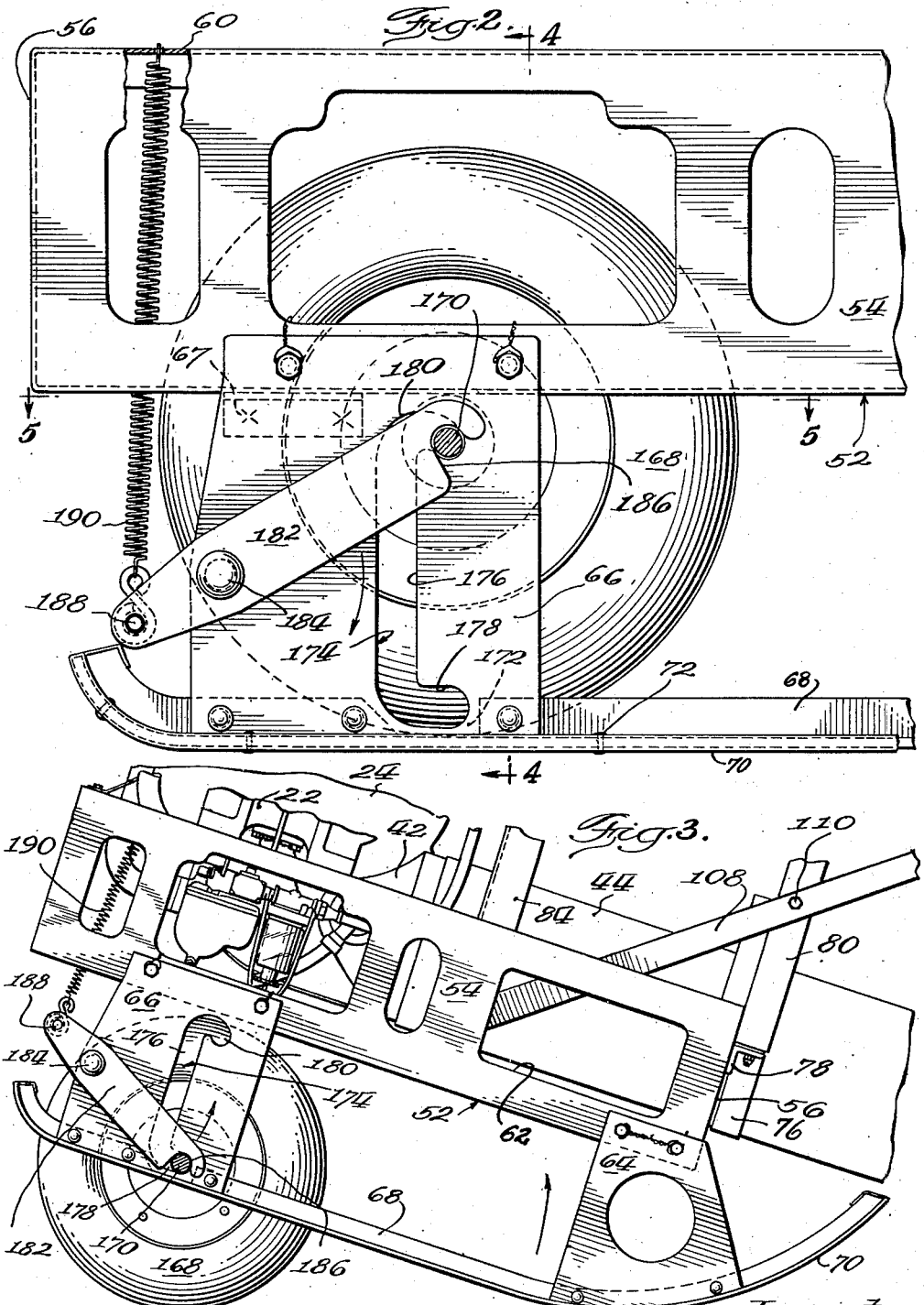

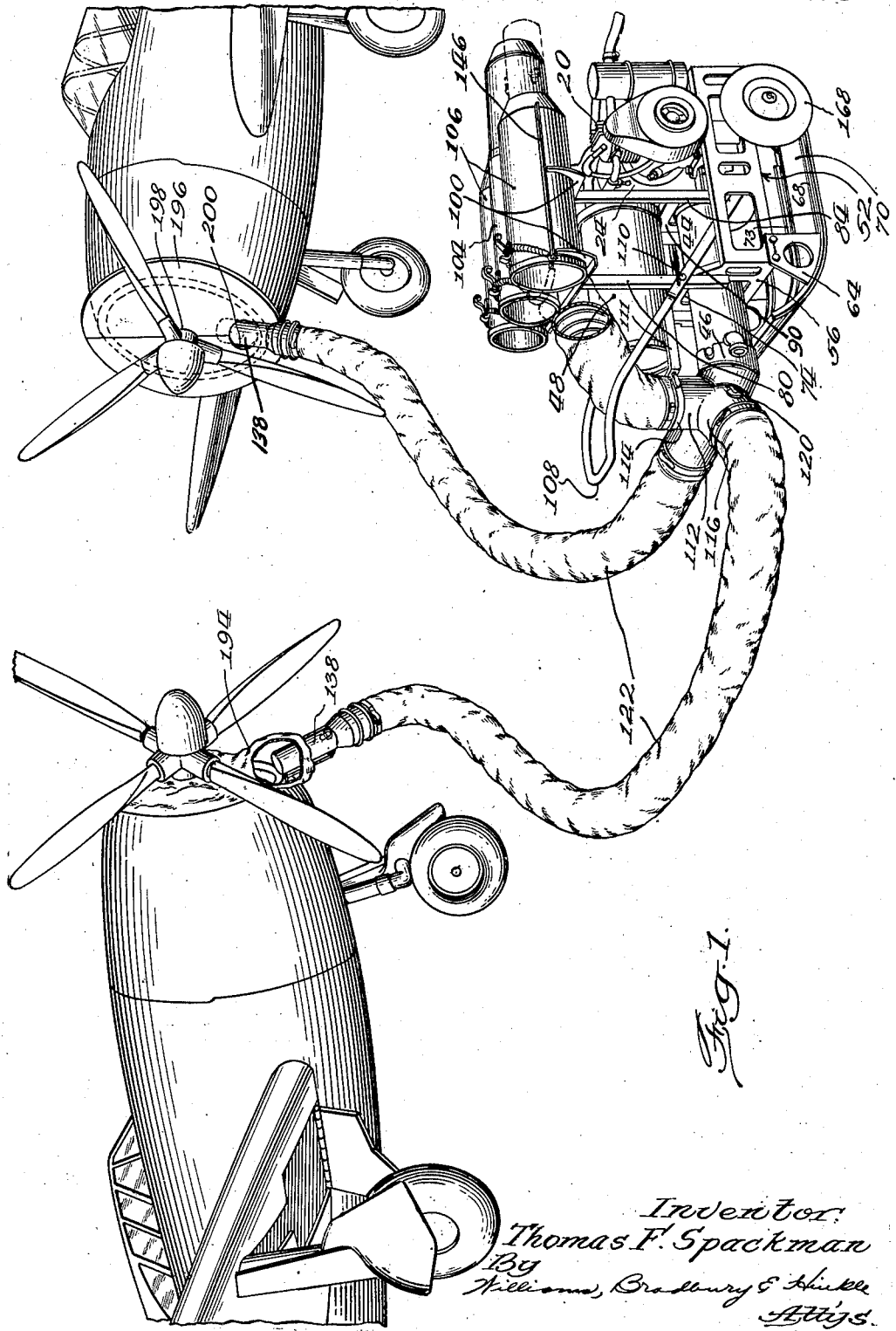

Jan. 14, 1947. T. F. SPACKMAN 2,414,214
CONVERTIBLE VEHICLE
Filed April 17, 1942 3 Sheets—Sheet 3

Inventor:
Thomas F. Spackman
By
Williams, Bradbury & Hinkle
Attys.

Patented Jan. 14, 1947

2,414,214

UNITED STATES PATENT OFFICE 2,414,214

CONVERTIBLE VEHICLE

Thomas F. Spackman, Chicago, Ill., assignor to Stewart-Warner Corporation, Chicago, Ill., a corporation of Virginia Application April 17, 1942, Serial No. 439,331

5 Claims. (Cl. 280—9)

1

The present invention relates to vehicles and is more particularly concerned with the provision of a portable or ground type heater carriage, having novel features which particularly adapt it for use on airports and on various types of terrain.

It is one of the objects of the present invention to provide a portable heater carriage particularly well adapted for use on airports and on various types of terrain.

Yet another object of the present invention is to provide a novel carriage for an airport heater which is compact and can be moved about with ease over either hard surfaces or over slush or mud or deep snow.

Still another object of the present invention is to provide a novel carriage for a portable heater of compact design which can be quickly converted for use either over hard surfaces or over deep snow or muddy surfaces.

Still another object of the present invention is to provide a novel carriage for supporting a heating unit to provide easy portability for such a unit.

Other objects and advantages will become apparent from the following description of a preferred embodiment of my invention taken in conjunction with the accompanying drawings, in which:

Fig. 1 is a perspective view of a portable airport heater embodying the present invention shown in use for warming cold airplane motors;

Fig. 2 is a detailed view showing a portion of the heater carriage on a large scale so as better to illustrate features of the present invention. This view may be considered as a side elevation of the portion shown with one wheel removed from the structure and is indicated as being taken substantially along the line 2—2 of Fig. 4, looking in the direction of the arrows;

Fig. 3 is a detailed view, showing the portion of the mechanism illustrated in Fig. 2 with a part thereof in an alternative position and in association with related apparatus;

Figure 4:
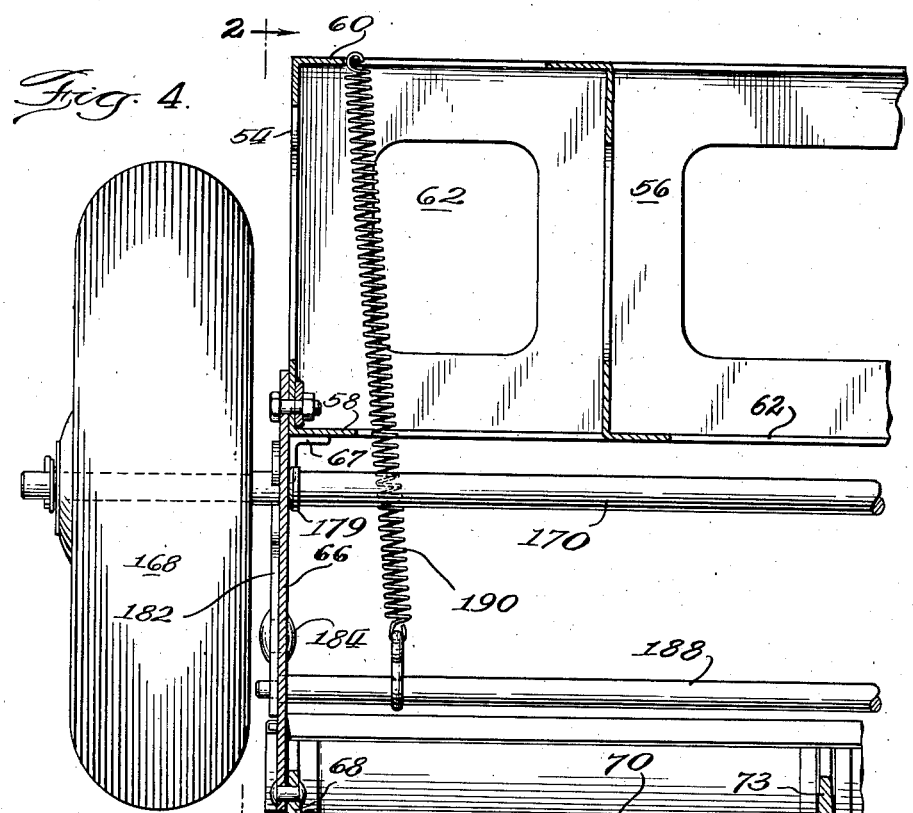
Fig. 4 is a vertical transverse sectional view through a portion of the apparatus and may be considered as taken in the direction of the arrows substantially along the line 4—4 of Fig. 2.

The portable heater illustrated in the accompanying drawings may conveniently be considered

2 in two portions. One of these portions comprises the heater itself, that is, the operating heater mechanism, while the other portion comprises the carriage for the heater. The heating unit per se is described more particularly in the copending application of Henry J. De N. McCollum, entitled "Heater," filed on even date herewith, and which bears Serial No. 439,342.

The heating unit comprises a small internal combustion engine 20 which drives a Roots blower 22 and an air circulating blower 24. The Roots blower 22 supplies a combustible mixture to a heater combustion chamber 42 where the mixture is ignited and burned and then passed through a heat-exchanger 44 and therefrom to the atmosphere. The hot products of combustion, in passing through the heat-exchanger 44, heat the latter and this heat is transferred through the walls thereof to the air circulated by the blower 24. The fresh air thus heated passes into a manifold 46 which is formed with an upwardly extending sleeve 112 and side sleeves 116. The side sleeves 116 are connected to collapsible hot air ducts 122, each of which is provided at its outer end with a nozzle 138. One nozzle 122 is shown connected to a blanket 194 stuffed around the engine cowling, and the other to a cover 196 provided with an opening 198 to receive the propeller shaft and an opening 200 to receive the nozzle 138. In this way heated air may be supplied to warm the airplane engines. The sleeve 112 may be similarly fitted with a collapsible duct. When not in use the collapsible ducts are stored in tubes 104 and 106 mounted on the portable carriage.

Although the truck and other equipment comprising the present invention may be used for other purposes, its particular purpose in the present instance is to provide an arrangement for using a heating unit of the above described type in an easily portable device which includes necessary equipment for conveying the hot air produced by the heating apparatus to airplane engines to be heated and for similar purposes.

The structure comprises a frame member 52 made up of comparatively deep side members 54 connected at their ends by front and back transverse members 56, these upstanding members being secured to a bottom 58. This structure may be considered as a shallow tray, having inwardly extending flanges 60 at its upper edge and several large openings 62 both in the bottom and in the side walls to reduce its weight and to facilitate adjustment and servicing of the equipment located within the frame. It can be constructed by welding together flat flanged plates or by other suitable means.

At its forward end the frame member 52 is bolted at each side to a downwardly extending side plate 64, and near its rearward end to similar downwardly extending side plates 66. To help distribute the load to these plates, L-shaped pieces 67 are welded against their inner faces with the projecting portion of the pieces lying against the lower edges of the frame members 54. These plates 64 and 66 at their lower ends are secured to the webs of T-shaped rails or runners 68 which extend from a position somewhat rearwardly of the plates 66 to a position ahead of the forward plates 64. The forward ends of the runners 68 are curved upwardly gradually, while the rearward ends are bent up rather sharply. A sheet of metal 70 extends from end to end and between these runners and thus encloses the space therebetween. At its edges it is bent over the runners and is secured thereto at intervals by appropriate fastening elements such as the rivets 72, while at its ends, the sheet is folded over and welded to the runner ends. The sheet 70, together with the runners 68, forms a sled or toboggan type structure having an upwardly swept front end. Thus the lower surface of this sled when in contact with the ground distributes the weight of the apparatus over a considerable area. To stiffen the bottom sheet 70 in the center, a third runner 73 extends longitudinally between the runners 68 and is secured to the sheet by rivets 72 inserted through the sheet and the runner flanges and by welding the sheet to the runner ends.

The internal combustion engine 20 and associated mechanism, including the blowers 22 and 24, the combustion chamber 42, and the connecting piping are secured to the frame 52 substantially directly over the back side plates 66. The heat exchanger 44 is cylindrical and extends forwardly from the combustion chamber 42 through an opening 74 in the forward cross member 56 of the frame 52 and has its opposite end fitted into an inlet sleeve of the hot air manifold 46.

At the point where the heat exchanger 44 passes through the forward cross member 56, it is supported by a pair of straps 76 which embrace the heat exchanger and are bolted at their ends to a pair of brackets 78 welded to the front face of the cross member 56. A pair of upstanding members 80, which pass along the sides of a fuel tank 48, are welded to the forward face of the cross member 56, while a similar set of upstanding members 84 are welded to an intermediate frame cross member 90 located adjacent the rear end of the heat exchanger 44. This intermediate cross member is similar to the end member 56 and similarly has an opening through which the heat exchanger passes.

The fuel tank 48 is positioned horizontally between the upstanding members 80 and 84 and is supported by arcuate bands which pass thereunderneath and are welded at their ends to the upright members 80 and 84, and at their central points to the upper faces of the cross members 56 and 90. The tank 48 is held tightly in this cradle by other and complementary bands which overlie the upper portion of the tank and are bolted at their ends to the upper ends of the first mentioned bands.

The upright members 84 and 80 extend into position above the top of the tank 48 and at their upper ends are secured to a pair of cross members 100. These cross members have lower flanges bolted to the upper ends of the vertical members 80 and 84. Each of the cross members 100 has three transversely spaced semi-circular reentrant faces shaped therein adapted to embrace and support the three longitudinally extending tubes 104 and 106. These tubes are secured to the upstanding members 100 by rivets or other suitable means to form a rigid structure.

The tube 104 and the two tubes 106 may be formed integrally with each other from sheet metal in any suitable manner, those shown being comprised of two sheets, each having three parallel hemi-cylindrical depressions formed therein which register and match when the two sheets are placed face to face. At their opposite edges the sheets are connected together as indicated at 146 (Fig. 1) by rolling one sheet over the other, while between the depressions they are secured by spotwelds. These tubes are somewhat larger in diameter than the largest portions of the nozzles 138 or the ducts 122, so that the nozzles and collapsed ducts can slide therein from the front ends.

A handle 108, by which the device is manipulated, comprises a U-shaped portion which extends well forward of the manifold 46, having downwardly and rearwardly inclined arms which are secured by means of bolts 110 to the side members 80 at an intermediate point and to the frame 52 at their lower ends. This handle can be formed from a length of metal tube bent as described, with the lower portions of the arms flattened where they are secured to the frame.

Just inside the downwardly inclined arms of the handle 108, a U-shaped bracket 111 is secured to the frame at its ends while its mid portion extends forwardly and has an inwardly bowed face formed therein which rests against the rearward cylindrical surface of the vertically extending outlet sleeve 112 of the hot air manifold 46. A strap 114 embraces the forward face of the sleeve 112 at this point and is bolted at its ends to the bracket 111 so that by tightening the bolts secured to the ends of this strap, the manifold 46 can be drawn into position with its inlet sleeve slid over the outlet end of the heat exchanger 44.

Figure 5:
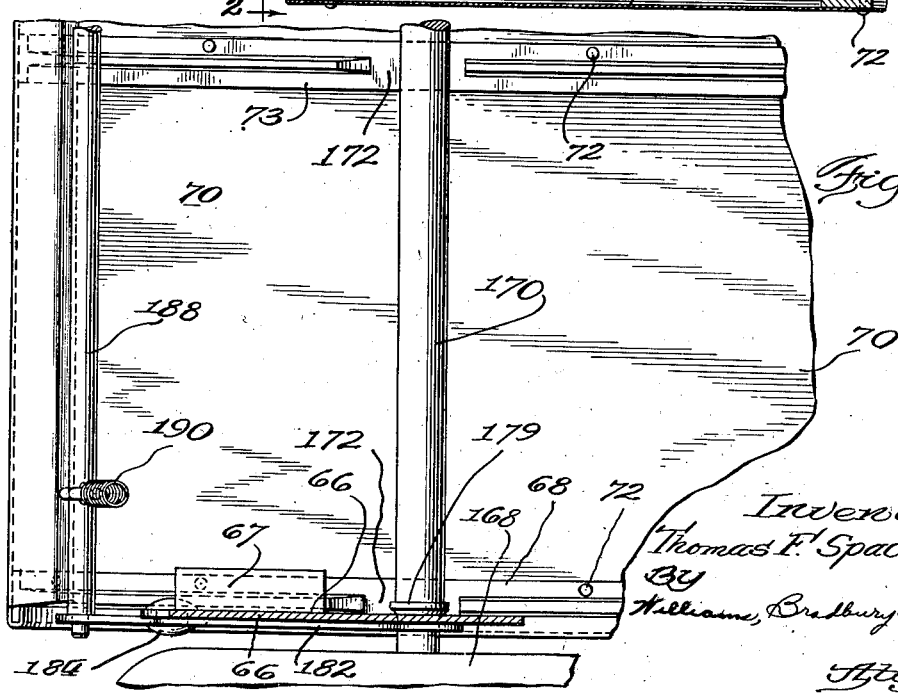
Fig. 5 is a horizontal sectional view of a portion of the apparatus and may be considered as taken in the direction of the arrows substantially along the line 5—5 of Fig. 2.

The portable heater as just described is excellently adapted for use over deep snow, muddy ground or other soft surfaces where the considerable area of the sheet 70 will prevent the device from sinking into the soft surface. It handles like a sled or toboggan, thus making it easy for an operator to pull the device about by means of the handle 108. Such a sled type base is not, however, particularly well adaptable for use on hard surfaces, such as concrete runways or the like. I have, therefore, provided a pair of rubber tired wheels 168 mounted upon an axle 170 which extends transversely through the plates 66 in a position just above the rails 68, a portion of the web of the rails being cut away, as indicated at 172, to permit the axle to be brought as low as possible relative to the sheet 70. This axle extends through slots 174 in the plates 66 and a pair of enlargements or collars 179 formed upon the axle just inside the plates, as shown in Figs. 4 and 5, prevent the axle from moving longitudinally. Each of these slots, as shown particularly in Figs. 2 and 3, comprises a vertically extending portion 176 which curves into a forwardly extending portion 178 at its lower end and into a forwardly and downwardly extending portion 180 at its upper end.

A pair of locking arms 182 are pivoted by loose rivets 184 or other suitable means to the plates 66 in a position rearwardly of the slots 174, and these rivets are so located that they are equidistant from the lower ends 178 and the upper ends 180 of the slots 174. At its forward end, each of the locking arms 182 is provided with a notch 186 which is adapted to fit over the upper face of the axle 170 when the axle is against the lower end of the slot 178. Likewise, since the upper end of the slot 180 is the same distance from the pivot point 184 as the lower end 178, the notch 186 will also fit over the axle 170 when the axle is located in the upper end 180 of the slot 174. The ends of the locking arms 182 opposite from the notches 186 are connected by a transversely extending rod 188, and a pair of coil springs 190 are hooked to this rod adjacent each end thereof and extend upwardly and are connected at their upper ends to the upper flanges 60 of the frame side members 54. The springs 190, therefore, continuously urge the bar 188 upwardly, thus tending to rotate the forward ends of the locking arms 182 downwardly.

In Fig. 3 the axle 170 is shown located at the lower ends 178 of the slots 174 with the notches 186 of the locking arms embracing the upper face of the axle. With the axle in this position the wheels 168 project well below the bottom sheet 70, thus tilting the carriage forwardly with the rounded forward portion of the sheet 70 against the ground surface. Inasmuch as the weight of the apparatus is transferred to the axle 170 principally by the plates 66 at the top edges of the slot portions 178, there will be very little tendency for the axle to slip rearwardly in the lower portions 178 of these slots. However, such tendency as there is for the axle to move in this direction will be offset by the locking members 182, since any tendency of the axle to move in this direction will be directed substantially toward the pivot points at the rivets 184. Thus, only comparatively little tension in the springs 190 will be necessary to insure the axle being locked against the ends of the lower portions 178 of the slots 174.

When it is desired to move the apparatus on its supporting wheels over a hard surface, the operator grasps the handle 108 and lifts the forward portion of the sheet 70 clear of the ground. The apparatus can then be pulled about by the operator, or it can be pushed like a wheelbarrow. When the operator encounters a soft surface into which the wheels 168 will sink to an undesirable extent, the operator depresses the bar 188, thus lifting the forward ends of the locking arms 182 and, if necessary, gives the device a slight forward push sufficiently to move the axle 170 rearwardly into the vertical portions 176 of the slots 174. The carriage is then lowered with the axle 170 moving relatively upwardly through the vertical portions 176 of the slots 174 until the bottom sheet 70 rests flat upon the ground or snow. The axle 170 is then raised slightly more and pushed forwardly into the position where it drops into the downwardly inclined forward portions 180 of the slots 174. The bar 188 is then released to permit the springs 190 to return the locking arms 182 into locking position. The positions of the several elements with the device thus adapted for use over deep snow or muddy surfaces is shown in Fig. 2.

To return the wheels to operating position, the bar 188 is again depressed to release the locking arms 182 and the wheels are lifted slightly and pulled rearwardly so that the axle 170 is located in the vertical portions 176 of the slots 174. The operator then lifts the rearward portion of the device whereupon the axle 170 will automatically move downwardly in the slots 174 until it reaches the bottoms thereof, whereupon it will roll forwardly against the lower ends of the slots as soon as the wheels are lifted from the ground. As soon as the axle is in this positon, the bar 188 can be released to permit the springs 190 to latch the notches 186 at the forward ends of the locking arms 182 over the axle 170.

A typical use to which the present device may be put is that of warming cold airplane motors. Such use is shown in Fig. 1. The device is moved into position either upon its wheels or upon the flat bottom surface of the sled and the required number of hoses and nozzles are pulled from their cylinders. If only one of these ducts is used, it should be the duct connected to the central sleeve 112 of the manifold 46, since the upper sleeve of the manifold to which this duct is connected has no damper (dampers being provided in the sleeves 116, operable by handles 120). If only the duct connected to the central sleeve is used, the dampers in the other two sleeves are closed, thus preventing waste of heat. The reason why only two dampers are provided is that this insures the heater not being started under such conditions that no hot air can escape, since under these conditions the heater would be likely to burn out or become otherwise injured. Another reason, of course, is that whenever the heater is operating, at last one of the ducts will be used. Therefore, no more than two dampers are necessary and the cost of providing three dampers is thus unwarranted.

From the above description of a preferred embodiment of my invention, it will be seen that a device constructed according to this invention is admirably adapted for use about airports or other places where portability is desirable, and further, that this invention accomplishes all of the objectives set forth for it at an earlier portion of this specification.

While I have shown and described a particular embodiment of my invention, it will be apparent to those skilled in the art that my invention is not limited to the particular construction disclosed. I, therefore, wish to include within the scope of the following claims, all constructions by which substantially the results of my invention are obtained by substantially the same or equivalent means.

I claim:

1. In a device of the type described, a sled type structure, a pair of side members extending upwardly from said sled type structure, said side members having vertical slots therein, each of said slots having offset slotted portions at the upper and lower ends thereof, an axle extending through said slots, wheels carried by said axle, said axle being adapted to move vertically in said slots into either of said offset portions, said axle when in said lower offset portions being positioned with the lower extremities of said wheels beneath the lower extremity of said sled type structure, and pivotally mounted arms adapted by engagement with said axle at opposite sides of the device to hold the axle releasably in either the upper or the lower offset portions.

2. In a device of the type described, means providing a supporting surface of considerable area, a pair of side members extending upwardly from said means, said side members having vertical slots therein, each of said slots having offset portions at the upper and lower ends thereof, an axle extending through said slots, wheels carried by said axle, said axle being adapted to move vertically in said slots into either of said offset portions, said axle when in said lower offset portions being positioned with the lower extremities of said wheels beneath the lower extremity of the surface providing means, a pivoted locking member adapted to secure said axle in said lower offset portion, the point about which said member pivots being substantially equidistant from said lower offset portion and said upper offset portion so that said pivoted locking member will also lock said axle in said upper offset portion.

3. In a device of the type described, means providing a supporting surface of considerable area, a pair of side members extending upwardly from said means, said side members having vertical slots therein, each of said slots having offset portions at the upper and lower ends thereof, an axle extending through said slots, wheels carried by said axle, said axle being adapted to move vertically in said slots into either of said offset portions, said axle when in said lower offset portions being positioned with the lower extremities of said wheels beneath the lower extremity of the surface providing means, and movably mounted arms adapted in adjusted positions to block said axle from movement out of said lower offset portions.

4. In a device of the type described, the combination of a framework, supporting means therefor having a bottom supporting face of considerable size, side portions of said framework having slots therein each comprising a vertical portion and top and bottom portions extending substantially horizontally therefrom, an axle extending through said slots, wheels carried by said axle of a size adapted to extend below the framework when the axle is in the bottom slot extensions, and arms pivotally mounted on said framework in position to engage said axle in either the top or the bottom slot extensions so as to block the axle from movement out of the slot extensions and serving thus to lock the axle positively in position.

5. In a device of the type described, the combination of a framework, supporting means therefor having a bottom supporting face of considerable size, side portions of said framework having slots therein each comprising a vertical portion and top and bottom portions extending substantially horizontally therefrom, an axle extending through said slots, wheels carried by said axle of a size adapted to extend below the framework when the axle is in the bottom slot extensions, arms pivotally mounted on said framework in position to engage said axle in either the top or the bottom slot extensions so as to block the axle from movement out of the slot extensions and serving thus to lock the axle positively in position, and coiled springs normally holding said arms yieldingly in engagement with said axle.

THOMAS F. SPACKMAN.